(12) United States Patent
Nagaoka

(10) Patent No.: US 7,867,934 B2
(45) Date of Patent: Jan. 11, 2011

(54) OPTICAL GLASS

(75) Inventor: Atsushi Nagaoka, Sagamihara (JP)

(73) Assignee: Ohara, Inc., Kanagawa (JP)

( * ) Notice: Subject to any disclaimer, the term of this patent is extended or adjusted under 35 U.S.C. 154(b) by 78 days.

(21) Appl. No.: 11/876,283

(22) Filed: Oct. 22, 2007

(65) Prior Publication Data

US 2008/0096752 A1  Apr. 24, 2008

(30) Foreign Application Priority Data

Oct. 23, 2006 (JP) ............................. 2006-287916

(51) Int. Cl.
*C03C 3/062* (2006.01)
*C03C 3/064* (2006.01)
*C03C 3/12* (2006.01)
*C03C 3/14* (2006.01)

(52) U.S. Cl. ............................. 501/73; 501/78; 501/79; 501/77; 501/41; 501/49; 501/50

(58) Field of Classification Search ............. 501/41–52, 501/73, 77–79
See application file for complete search history.

(56) References Cited

U.S. PATENT DOCUMENTS

| | | | | |
|---|---|---|---|---|
| 6,653,251 B2 * | 11/2003 | Sugimoto et al. | ............. | 501/78 |
| 6,875,714 B2 | 4/2005 | Izuki | | |
| 7,098,158 B2 * | 8/2006 | Natsugari et al. | ............. | 501/78 |
| 2003/0064878 A1 * | 4/2003 | Sugimoto et al. | ............. | 501/73 |
| 2003/0191006 A1 * | 10/2003 | Natsugari et al. | ............. | 501/49 |
| 2005/0037913 A1 | 2/2005 | Peuchert et al. | | |
| 2006/0100084 A1 | 5/2006 | Nagashima et al. | | |

FOREIGN PATENT DOCUMENTS

| | | | |
|---|---|---|---|
| JP | 62119138 | * | 5/1987 |
| JP | 63274638 | * | 11/1988 |
| JP | 04037627 | * | 2/1992 |
| JP | 08-157231 A | | 6/1996 |
| JP | 09-020530 A | | 1/1997 |
| JP | 11106236 | * | 4/1999 |
| JP | 2002-201039 A | | 7/2002 |
| JP | 2003-300751 A | | 10/2003 |
| JP | 2003-321245 A | | 11/2003 |
| JP | 2004-018312 A | | 1/2004 |
| JP | 2004-059362 A | | 2/2004 |
| JP | 2004-292299 A | | 10/2004 |
| JP | 2005-502574 A | | 1/2005 |
| JP | 2006160599 | * | 6/2006 |
| JP | 2006225255 | * | 8/2006 |
| JP | 2006342044 | * | 12/2006 |
| WO | WO 03/022755 A2 | | 3/2003 |

OTHER PUBLICATIONS

W. H. Dumbaugh, "Heavy metal oxide glasses containing $Bi_2O_3$", Physics and Chemistry of Glasses, vol. 27, No. 3, pp. 119-123, Jun. 1986.
William. H. Dumbaugh et al., "Heavy-Metal Oxide Glasses", Journal of the American Ceramic Society, vol. 75, No. 9, pp. 2315-2325, Sep. 1992.
Josef C. Lapp, "Alkali Bismuth Gallate Glasses", American Ceramic Society Bulletin, vol. 71, No. 10, pp. 1543-1552, Oct. 1992.
N. Ford et al., "Optical and physical properties of glasses in the systems $GeO_2$-$Bi_2O_3$-PbO and $TeO_2$-$Bi_2O_3$-$WO_3$", Glass Technology, vol. 28, No. 2, pp. 106-113, Apr. 1987.
J. Fu et al., "New families of glasses based on $Bi_2O_3$", Physics and Chemistry of Glasses, vol. 36, No. 5, pp. 211-215, Oct. 1995.
Isabella-Ioana Oprea et al., "Optical properties of bismuth borate glasses", Optical Material 2290, Feb. 11, 2004.
P. Becker, "Thermal and optical properties of glasses of the system $Bi_2O_3$-$B_2O_3$", Crystal Research and Technology, vol. 38, No. 1. P74-82, 2003.

* cited by examiner

*Primary Examiner*—Karl E Group
(74) *Attorney, Agent, or Firm*—Westerman, Hattori, Daniels & Adrian, LLP

(57) ABSTRACT

Optical glass containing bismuth oxide having good defoamability. The Optical glass contains, as % by mass, from 10 to less than 90% of a $Bi_2O_3$ component and at least 0.1% of a $TeO_2$ and/or $SeO_2$ component. The optical glass is on Grade 4 to Grade 1 in "JOGIS12-1994, Method for Measuring Bubbles in Optical Glass". By controlling the amount of RO component (R is at least one selected from a group consisting of Zn, Ba, Sr, Ca, Mg) and $Rn_2O$ component (Rn=Li, Na, K, Cs), the clarifying time may be shortened.

18 Claims, No Drawings

OPTICAL GLASS

BACKGROUND OF THE INVENTION

1. Field of the Invention

The present invention relates to bismuth oxide-containing optical glass, more precisely to bismuth oxide-containing optical glass having good deformability.

2. Description of the Related Art

The recent tendency toward increased integration and enhanced function for optical instruments is much advanced, for which the demand for high-definition, lightweight and down-sized optical systems is being much increased, and for realizing the demand, optical planning with non-spherical lenses of high-refractivity high-dispersibility glass is being a mainstream in the art so as to reduce the necessary number of lenses. Non-spherical lenses are generally produced through precision pressing, for which, therefore, desired is low Tg optical glass producible inexpensively. One advantage of precision press-molding is that lenses having a final shape may be produced without necessity of lens machining and polishing. Another advantage is that even non-spherical lenses that are difficult to machine and polish may be produced through precision pressing alone.

Many types of high-refractivity high-dispersibility region glass have been developed, and most of them are of phosphate glass containing an $Nb_2O_5$ component at high purity. For example, Patent References 1 and 2 disclose $P_2O_5$—$Nb_2O_5$—$WO_3$—($K_2O$, $Na_2O$, $Li_2O$) glass; and Patent Reference 3 discloses $P_2O_5$—$Nb_2O_5$—$TiO_2$—$Bi_2O_3$—$Na_2O$ glass. However, the glass transition point (Tg) of these types of optical glass is not so low, and another defect thereof is that their devitrification resistance is poor.

Glass containing a large quantity of a $Bi_2O_3$ component has been developed for one having a low glass transition point (Tg). For example, Non-Patent References 1 to 5 disclose $Bi_2O_3$—$Ga_2O_3$—PbO type, $Bi_2O_3$—$Ga_2O_3$—($Li_2O$, $K_2O$, $Cs_2O$) type and $Bi_2O_3$—$GeO_2$ type of glass. These types of glass have a relatively low Tg; however, the glass absorption end is on the longer wavelength side than 450 nm and their transmittance in a visible region is insufficient, and therefore the glass of those types is problematic in that they could not be used as optical glass required to have high transmittance within a visible region.

Patent Reference 1: JP-A 2003-321245
Patent Reference 2: JP-A 8-157231
Patent Reference 3: JP-A 2003-300751
Non-Patent Reference 1: Physics and Chemistry of Glasses, p. 119, Vol. 27, No. 3. June 1986
Non-Patent Reference 2: American Ceramic Society, p. 2315, Vol. 75, No. 9, October 1992
Non-Patent Reference 3: American Ceramic Society Bulletin, p. 1543, Vol. 71, No. 10, October 1992
Non-Patent Reference 4: Glass Technology, p. 106, Vol. 28, No. 2, April 1987

As above, optical glass containing a large quantity of a $Bi_2O_3$ component is excellent in its thermal properties and optical properties, but could not solve the problem of production technology, and therefore its realization as optical glass is difficult. In particular, when a platinum crucible is used for glass melting, then glass of the type causes some problems in that platinum ion may dissolve in the glass melt and glass may form platinum alloys. Owing to such glass properties, not only expensive platinum crucibles used may be damaged but also the platinum component having dissolved in glass may worsen the light transmittance of the glass. Therefore, for preventing such reactions, various methods have been employed.

A most simple method taken in the art comprises lowering the glass melting temperature as much as possible, and melting glass at a relatively low temperature. However, the method is problematic in that a large amount of bubbles may remain especially in the produced optical glass that contains a large quantity of a $Bi_2O_3$ component. When bubbles remain in optical glass, then after all they worsen the light transmittance of the glass, therefore greatly lowering the value of the product as optical glass. Accordingly, desired is a method capable of melting glass without leaving a large amount of bubbles therein even when optical glass containing a large quantity of a $Bi_2O_3$ component is melted at a low temperature.

SUMMARY OF THE INVENTION

The invention has been made in consideration of the above-mentioned problems, and is to provide bismuth oxide-containing optical glass having excellent defoamability.

The present inventors have assiduously studied for the purpose of solving the above problems and, as a result, have found that, when a predetermined amount of a $TeO_2$ and/or $SeO_2$ component is added to $Bi_2O_3$-containing glass, then desired optical glass may be obtained inexpensively at a low production cost, having a desired refractive index, a desired Abbe's number and a sufficiently low glass transition point and having excellent defoamability, and have completed the present invention. More concretely, the invention provides the following:

(1) Optical glass containing, as % by mass, from 10 to less than 90% of a $Bi_2O_3$ component and at least 0.1% of a $TeO_2$ and/or $SeO_2$ component, which is on Grade 4 to Grade 1 in "JOGIS12-1994, Method for Measuring Bubbles in Optical Glass".

Containing from 10% to less than 90% of a $Bi_2O_3$ component, the optical glass of the invention may have a low glass transition point. Accordingly, the precision press-molding temperature for it may be suppressed low as a whole, and as a result, the propagation of mold surface deterioration may be prevented and the mold life may be prolonged. Further, as containing a $TeO_2$ and/or $SeO_2$ component, the optical glass may be good light transmittance and may be produced through low-temperature melting.

(2) The optical glass of (1), having optical constants of a refractive index [nd] of at least 1.70 and an Abbe's number [vd] of at least 10.

The glass of this embodiment has high refractivity and high dispersibility, and therefore the number of the glass sheets to be in an optical system may be reduced and the appliance comprising the optical system of the type may be lightweight and small-sized.

(3) The optical glass of (1) or (2), having a glass transition point (Tg) of not higher than 530° C.

The glass of this embodiment has a glass transition point of not higher than 530° C., and therefore its press-molding temperature may be lower than about 600° C. Accordingly, the temperature in re-heating it may be low, and the life of the precision pressing mold for it may be prolonged.

(4) The optical glass of any of (1) to (3), containing an RO component (R represents at least one selected from a group consisting of Zn, Ba, Sr, Ca, Mg).

As containing an alkaline earth metal oxide and ZnO, the glass of this embodiment may have high stability.

(5) The optical glass of (1) to (4), containing, as % by mass, an $Rn_2O$ component (Rn represents at least one selected from a group consisting of Li, Na, K, Cs) in an amount of at least 0.1%.

Since the glass of this embodiment contains an alkali metal component, the glass melt viscosity may be lowered and the bubbles-increasing speed may be increased for more effective defoaming.

(6) The optical glass of (1) to (5), containing, as % by mass, from more than 0% to 30 of a $B_2O_3$ component and from more than 0% to 30% of an $SiO_2$ component.

Containing a predetermined amount of a $B_2O_3$ component and an $SiO_2$ component, the glass of this embodiment may have increased devitrification resistance.

(7) The optical glass of any of (1) to (6), containing the following components as optional components as % by mass:

| | |
|---|---|
| $Al_2O_3$ | 0 to 20% and/or |
| $TiO_2$ | 0 to 20% and/or |
| $Nb_2O_5$ | 0 to 20% and/or |
| $WO_3$ | 0 to 15% and/or |
| $Ta_2O_5$ | 0 to 15% and/or |
| $ZrO_2$ | 0 to 15% and/or |
| ZnO | 0 to 20% and/or |
| MgO | 0 to 20% and/or |
| CaO | 0 to 30% and/or |
| SrO | 0 to 40% and/or |
| BaO | 0 to 40% and/or |
| $Li_2O$ | 0 to 20% and/or |
| $Na_2O$ | 0 to 20% and/or |
| $K_2O$ | 0 to 20% and/or |
| $Cs_2O$ | 0 to 20% and/or |
| $Y_2O_3$ | 0 to 10% and/or |
| $La_2O_3$ | 0 to 10% and/or |
| $Gd_2O_3$ | 0 to 10% and/or |
| $Yb_2O_3$ | 0 to 10% and/or |
| $P_2O_5$ | 0 to 10% and/or |
| $Sb_2O_3$ | 0 to 3% and/or |
| $GeO_2$ | 0 to 20%, | and containing the components in such a manner that the total amount of F in fluoride substitution of a part or all of the above oxides may be from 0 to 5% by mass based on 100% by mass of the above oxide standard composition; wherein RO (R represents at least one selected from a group consisting of Zn, Ba, Sr, Ca, Mg)+$Rn_2O$ (wherein Rn represents at least one selected from a group consisting of Li, Na, K, Cs) accounts for at most 50%, and $Y_2O_3$+$La_2O_3$+$Gd_2O_3$+$Yb_2O_3$ accounts for at most 10%.

Having the above composition, the optical glass produced herein may have a desired refractive index, a desired Abbe's number, a satisfactorily low glass transition point and excellent defoamability, and the desired optical glass may be produced inexpensively at a low cost.

(8) A preform for precision press-molding, comprising the optical glass of (1) to (7).

(9) An optical device formed through precision press-molding of the precision press-molding preform of (8).

(10) A method for producing optical glass containing, as % by mass, from 10 to less than 90% of a $Bi_2O_3$ component, which comprises adding, as its oxide, at least 0.1% of a Te and/or Se component to the starting material.

According to this embodiment, optical glass having good light transmittance may be produced efficiently without leaving bubbles in the step of melting glass that comprises a $Bi_2O_3$ component as the main component thereof.

"Adding, as its oxide, at least 0.1% of a Te and/or Se component" means that, when any other compound than oxide is used as the Te and/or Se component to be in the melting glass material, then its amount is at least 0.1% as converted into the content of $TeO_2$ and $SeO_2$. This may be because the glass material may contain any other compound of the Te and/or Se component than their oxides, but they may all be converted into oxides while glass is melted.

As comprising the above-mentioned constitutional requirements, the invention may provide optical glass having good defoamability.

In its production, the optical glass of the invention may be efficiently defoamed in the step of clarifying and vitrifying it, while it keeps high refractivity and high dispersibility necessary for $Bi_2O_3$-based optical glass and has a low glass transition point. For example, the clarifying and vitrifying temperature for the glass in melting it may be lowered, and the clarifying and vitrifying time may be shortened. Further, the melting time may be shortened and the melting temperature may be lowered, and therefore the reactivity of the glass with metal crucibles may be lowered.

DETAILED DESCRIPTION OF THE INVENTION

The optical glass of the invention is described below with reference to its concrete embodiments.

[Glass Component]

The compositional range of each component constituting the optical glass of the invention is described below. Each component is in terms of % by mass. The glass composition expressed in terms of % by mass in this description is all as % by mass as the oxide standard of the component. "As the oxide standard" as referred to herein means that, when the oxide, the composite salt, the metal fluoride and others used as the starting materials for the glass constitutive components in the invention are presumed to be all decomposed and converted into their oxides in melting them, then each component of the glass is expressed as % by mass based on the sum total of the mass of the produced oxides, 100% by mass; and the total amount of F in partial or entire fluoride substitution of the above oxides means that the fluorine content to exist in the glass composition in the invention is expressed as % by mass of F atom based on the oxide standard composition, 100%.

<Essential Components, Optional Components>

The $Bi_2O_3$ component is a component indispensable for realizing the improvement of the stability of glass, the increase in the refractivity and dispersibility thereof, the lowering of Tg thereof and the improvement of the durability thereof. However, if its amount is too large, then the transmittance of glass itself before pressing may be worsen; and if too small, then the high optical constants necessary for broad optical planning latitude may be difficult to satisfy. Accordingly, the lowermost limit of the $Bi_2O_3$ component is preferably 10%, more preferably 15%, most preferably 20%; and the uppermost limit thereof is preferably less than 90%, more preferably 88%, most preferably 85%.

The $TeO_2$ component and the $SeO_2$ component are components extremely effective for improving the defoamability of optical glass containing a large quantity of a $Bi_2O_3$ component while the glass of the type may keep high refractivity and a low glass transition point. However, if their amount is too much, they may lower the stability of glass. Accordingly, the lowermost limit of one or both of these components is preferably 0.1%, more preferably 0.3%, most preferably 0.5%; and the uppermost limit thereof is preferably 10%, more preferably 8%, most preferably 3%. The uppermost limit of the content of each component is preferably 10%, more preferably 8%, most preferably 3%; and the lowermost limit thereof is not specifically defined.

The RO component (R is at least one selected from a group consisting of Zn, Ba, Sr, Ca, Mg) may be added for improving the meltability of glass and for controlling the optical constants thereof to desired ones. However, if their amount is too much, they may lower the stability, the chemical durability and the transmittance of glass. Accordingly, the lowermost limit of the total content of the RO component is preferably more than 0%, more preferably 0.5%, most preferably 1%; and the uppermost limit thereof is preferably 30%, more preferably 20%, most preferably 10%.

The ZnO component is a component effective for improving the chemical durability and improving the transmittance of glass. However, if its amount is too much, it may lower the stability of glass. Accordingly, the uppermost limit of the component is preferably 20%, more preferably 15%, most preferably 10%.

The BaO component is a component effective for increasing the refractivity of glass and for stabilizing glass. However, if its amount is too much, it may worsen the chemical durability of glass and may lower the stability thereof. Accordingly, the uppermost limit of the component is preferably 40%, more preferably 15%, most preferably 10%.

The SrO component is a component effective for keeping glass having high refractivity and high dispersibility. However, if its amount is too much, it may lower the transmittance of glass. Accordingly, the uppermost limit of the component is preferably 40%, more preferably 15%, most preferably 10%.

The CaO component is a component effective for increasing transmittance of glass and for improving the stability thereof. However, if its amount is too much, it may worsen the stability of glass. Accordingly, the uppermost limit of the component is preferably 30%, more preferably 20%, most preferably 15%.

The MgO component is a component effective for greatly improving the dispersibility of glass. However, if its amount is too much, it may worsen the devitrification resistance of glass in a pressing temperature range. Accordingly, the uppermost limit of the component is preferably 20%, more preferably 10%, most preferably 5%.

The $Rn_2O$ component (Rn=Li, Na, K, Cs) may be in glass for improving the meltability of glass and for lowering the glass transition point thereof. However, if its amount is too much, it may worsen the chemical durability of glass. Accordingly, the lowermost limit of the total content of the $Rn_2O$ component is preferably 0.1, more preferably 0.5%, most preferably 1%; and the uppermost limit thereof is preferably 20%, more preferably 10%, most preferably 5%.

The $Li_2O$ component is a component effective for lowering glass Tg and for improving glass stability and meltability. However, if its amount is too much, it may worsen the chemical durability of glass. Accordingly, the uppermost limit of the component is preferably 20%, more preferably 10%, most preferably 5%.

The $Na_2O$ component is a component effective for lowering glass Tg and for improving glass meltability. However, if its amount is too much, it may worsen the stability and the chemical durability of glass. Accordingly, the uppermost limit of the component is preferably 20%, more preferably 10%, most preferably 5%.

The $K_2O$ component is a component effective for lowering glass Tg. However, if its amount is too much, it may worsen the stability and the chemical durability of glass. Accordingly, the uppermost limit of the component is preferably 20%, more preferably 10%, most preferably 5%.

The $Cs_2O$ component is a component effective for lowering glass Tg. However, if its amount is too much, it may worsen the stability and the chemical durability of glass. Accordingly, the uppermost limit of the component is preferably 20%, more preferably 10%, most preferably 5%.

Preferably, the total content of the RO and $Rn_2O$ component is more than 0% for improving the stability of glass, for controlling the optical constants thereof and for lowering the glass transition point thereof, more preferably more than 1%, most preferably at least 3%. If the total content of RO and $Rn_2O$ component is too much, it may increase the liquid phase temperature of glass and may lower the chemical durability thereof. Accordingly, the uppermost limit of the total content of the component is preferably 50%, more preferably 45%, most preferably 40%.

The $B_2O_3$, $SiO_2$ and $Al_2O_3$ components are useful as a glass-forming component, and is a component effective for improving the transmittance of glass, for improving the viscosity relative to the liquid phase temperature thereof and for improving the chemical resistance thereof. Accordingly, it is desirable that the total content of at least one of the components is more than 0%, more preferably at least 3%, even more preferably at least 7%. However, if the total content of the components is too much, it may increase Tg. Preferably, the uppermost limit of the content is 50%, more preferably 45%, most preferably 40%. Within the range, stable glass having a low liquid phase temperature may be produced.

The $B_2O_3$ component is a component useful for improving the stability of glass. However, if its amount is too much, it may worsen the stability of glass and may increase the thermal factors thereof. Accordingly, it is desirable that its amount is more than 0%, and its lowermost limit is preferably 0.1%, more preferably 0.2%; and it supper most limit is preferably 30%, more preferably 20%, most preferably 10%.

The $SiO_2$ component is a component useful for improving the stability of glass and for increasing the viscosity thereof. However, if its amount is too much, it may worsen the stability of glass. Accordingly, it is desirable that its amount is more than 0%, and its lowermost limit is preferably 0.1%, more preferably 0.2%; and its uppermost limit is preferably 30%, more preferably 20%, most preferably 10%.

The $Al_2O_3$ component is a component useful for improving the stability of glass and for improving the chemical durability and the mechanical strength thereof. However, if its amount is too much, it may worsen the stability of glass. Accordingly, its uppermost limit is preferably 20%, more preferably 10%, most preferably 7%. $Al_2O_3$ may be absent.

The $TiO_2$ component is a component effective for controlling the optical constants of glass for high refractivity and high dispersibility. However, if its amount is too much, it may lower the transmittance of glass and may worsen the stability thereof. Accordingly, the uppermost limit of its amount is preferably 20%, more preferably 15%, most preferably 10%.

The $Nb_2O_5$ component is a component effective for increasing the refractivity of glass. However, if its amount is too much, it may worsen the stability of glass. Accordingly, the uppermost limit of its amount is preferably 20%, more preferably 15%, most preferably 10%.

The $WO_3$ component is a component effective for increasing the dispersibility of glass. However, if its amount is too much, it may worsen the stability of glass and may worsen the transmittance thereof. Accordingly, the uppermost limit of its amount is preferably 15%, more preferably 10%, most preferably 5%.

The $Ta_2O_5$ component is a component effective for increasing the refractivity of glass. However, if its amount is too much, it may worsen the stability of glass. Accordingly, the uppermost limit of its amount is preferably 15%, more preferably 10%, most preferably 5%.

The $ZrO_2$ component is a component effective for improving the chemical durability of glass. However, if its amount is too much, it may worsen the stability of glass. Accordingly, the uppermost limit of its amount is preferably 15%, more preferably 10%, most preferably 5%.

The $Y_2O_3$, $La_2O_3$, $Gd_2O_3$ and $Yb_2O_3$ component is effective for improving the chemical stability of glass, and these are optional components. However, if their amount is too much, the dispersibility of glass may be poor and the devitrification resistance thereof may also be poor. Accordingly, the uppermost limit of the total amount of the components is preferably 10%, more preferably 7%, most preferably 5%. The amount of each component may be at most 10% with no problem.

The $P_2O_5$ component is a component effective for improving the stability of glass, and is an optional component. However, if its amount is too much, it may promote phase separation of glass. Accordingly, the uppermost limit of its amount is preferably 10%, more preferably 5%, most preferably 1%. Still more preferably, the component is absent.

The $Sb_2O_3$ component may serve as a defoaming agent and may be effective for controlling the oxidation-reduction of glass and for increasing the dispersibility of glass, and it is an optional component. However, if its amount is too much, it may worsen the meltability of glass and lower the transmittance thereof. Accordingly, its uppermost limit is preferably 3%, more preferably 2%, most preferably 1%.

The $GeO_2$ component is a component effective for improving the coloration resistance of glass and for improving the stability thereof. However, it is expensive and its uppermost limit is preferably 20%, more preferably 10%, even more preferably 5%. Still more preferably, the component is absent.

F is effective for improving the meltability of glass, but may rapidly lower the refractivity thereof. It is an optional component. Accordingly, it is desirable that the uppermost limit of the total content of F in fluoride substitution of a part or all of the above oxides is 5% by mass, as calculated as the atom F based on the oxide standard composition of 100% by mass, more preferably 3%, most preferably 1%. Still more preferably, F is absent.

<Component that the Glass of the Invention Should Not Contain>

In the invention, the glass may contain, if desired, any other component not detracting from the properties of the glass. However, transition metal components of V, Cr, Mn, Fe, Co, Ni, Cu, Ag and Me, except Ti, may cause coloration of glass and may cause absorption thereof at a specific wavelength in a visible range, when they are in glass either singly or as combined together and even through their content is small. Accordingly, in optical glass to which light falling within a visible wavelength region is applied, it is desirable that these components are substantially absent. "Substantially absent" as referred to herein means that the components are not artificially added to glass except that they are mixed as impurities.

The Th component may be added for the purpose of increasing the refractive index of glass and for improving the stability thereof; and the Cd and Tl component may be added for the purpose of lowering Tg of glass. However, the recent tendency in the art is toward little use of Th, Cd, Tl and Os components as they are harmful chemical components. When these components are used, therefore, some measures must be taken for environmental protection not only in the process of producing glass but also in the step of processing glass materials and in the step of disposal of glass products. Accordingly, it is desirable that these components are substantially absent in glass when their influence on the environment is regarded as important.

A lead component must not be in the glass of the invention, since it requires some specific measures for environmental protection in production, processing and disposal of glass and since it is expensive.

The $As_2O_3$ component is a component used for bettering the removal of bubbles in melting glass (defoamability), but it requires some measures for environmental protection in production, processing and disposal of glass. Preferably, therefore, the glass of the glass of the invention does not contain $As_2O_3$.

The glass composition of the invention is expressed in terms of % by mass, and therefore it could not be expressed directly in terms of mol %. However, the components constituting the glass composition that satisfies the requirements in the invention may be expressed as mol %, for example, as follows in terms of the content of their oxides.

| | |
|---|---|
| $Bi_2O_3$ | 5 to 50%, |
| $SiO_2$ | more than 0 and up to 30%, |
| $B_2O_3$ | more than 0 and up to 50%, and |
| $Al_2O_3$ | 0 to 20% and/or |
| $TiO_2$ | 0 to 20% and/or |
| $Nb_2O_5$ | 0 to 20% and/or |
| $WO_3$ | 0 to 10% and/or |
| $Ta_2O_5$ | 0 to 10% and/or |
| $ZrO_2$ | 0 to 10% and/or |
| ZnO | 0 to 20% and/or |
| MgO | 0 to 30% and/or |
| CaO | 0 to 40% and/or |
| SrO | 0 to 40% and/or |
| BaO | 0 to 40% and/or |
| $Li_2O$ | 0 to 30% and/or |
| $Na_2O$ | 0 to 30% and/or |
| $K_2O$ | 0 to 30% and/or |
| $Y_2O_3$ | 0 to 20% and/or |
| $La_2O_3$ | 0 to 20% and/or |
| $Gd_2O_3$ | 0 to 20% and/or |
| $Yb_2O_3$ | 0 to 20% and/or |
| $P_2O_5$ | 0 to 50% and/or |
| $Sb_2O_3$ | 0 to 1% and/or |
| $GeO_2$ | 0 to 20% and/or |
| $TeO_2$ | 0 to 5% and/or |
| F | 0 to 10%. |

The optical glass of the invention has high refractivity and high dispersibility, and may have a low glass transition point (Tg) of not higher than 530° C. When the heat resistance of the mold and the mold film to be used in precision press-molding the glass is taken into consideration, the more preferred range of Tg is not higher than 510° C., even more preferably not higher than 480° C. If the glass Tg oversteps the range, the usable mold film and mold material may be noticeably limited.

In this description, "liquid phase temperature" means as follows: A glass sample ground to have a predetermined particle size is put on a platinum plate, then kept in a furnace having a temperature gradation profile for 30 minutes, taken out of it, and the softened glass sample is checked with a microscope for the presence or absence of crystallization, and the lowermost temperature at which the sample gave no crystallization indicates the liquid phase temperature.

When the optical glass of the invention is applied to various optical devices, it is desirable that the glass is on a level of from Grade 4 to Grade 1, as analyzed according to "Method for Measuring Bubbles in Optical Glass, JOGIS12-1994", more preferably from Grade 3 to Grade 1, most preferably from Grade 2 to Grade 1.

The optical glass of the invention is worked through precision press-molding typically for applications of lenses, prisms, mirrors. As so mentioned hereinabove, the optical glass of the invention may be used as a preform material for press-molding, or the glass melt may be directly pressed. In case where the glass is used as a preform material, its production method and its precision press-molding method are not specifically defined, for which, any known production method and molding method may be employable. Regarding the preform material production method, for example, the preform material may be directly produced from a glass melt according to the method for production of glass gob described in JP-A 8-319124 or according to the method and the apparatus for production of optical glass described in JP-A 8-73229; or it may be produced by cold-rolling a strip material.

EXAMPLES

The invention is described in more detail with reference to the following Examples, to which, however, the invention should not be limited. Examples 1 and 2 and Comparative Example 1 are to demonstrate high-refractivity optical glass comprising, as the main ingredients thereof, $B_2O_3$ and $Bi_2O_3$, and in these, the glass composition is similar to each other. The glass of Examples 1 and 2 contains a predetermined amount of $TeO_2$, but that of Comparative Example 1 does not contain $TeO_2$.

The starting materials were weighed as in the composition shown in Table 1, to have a total weight of 5000 g, and uniformly mixed. Using a quartz crucible or a metal crucible, the mixture was melted at 750° C. to 900° C. for 2 to 3 hours, and then cooled to 800° C. or so, kept as such for 1 hour, then cast into a mold to form glass. The properties of the thus obtained glass are shown in Table 1.

The optical glass samples of Examples were analyzed for their refractive index [nd] and Abbe's number [vd].

For measuring the refractive index [nd] and the Abbe's number [vd] thereof, the glass samples were gradually cooled at a cooling rate of −25° C./hr, and the thus-cooled samples were analyzed.

For the defoamability thereof, the glass samples were analyzed according to the Japanese Optical Glass Industrial Standards, "Method of Measuring Bubbles in Optical Glass", JOGIS12-1994.

TABLE 1

|  | Example 1 | Example 2 | Comparative Example |
|---|---|---|---|
| $SiO_2$ | 2.46 | 2.40 | 2.52 |
| $B_2O_3$ | 7.68 | 7.51 | 7.88 |
| $Al_2O_3$ |  |  |  |
| $Y_2O_3$ |  |  |  |
| $La_2O_3$ |  |  |  |
| $Gd_2O_3$ |  |  |  |
| $Yb_2O_3$ |  |  |  |
| $TiO_2$ |  |  |  |
| $ZrO_2$ |  |  |  |
| $Nb_2O_5$ |  |  |  |
| $Ta_2O_5$ |  |  |  |
| $WO_3$ |  |  |  |
| ZnO | 2.16 | 2.11 | 2.22 |
| MgO |  |  |  |
| CaO |  |  |  |
| SrO | 1.06 | 1.03 | 1.09 |
| BaO | 0.63 | 0.61 | 0.64 |
| $Li_2O$ | 1.22 | 1.19 | 1.25 |
| $Na_2O$ |  |  |  |
| $K_2O$ |  |  |  |
| $Sb_2O_3$ |  |  |  |
| $P_2O_5$ |  |  |  |
| $Bi_2O_3$ | 81.88 | 80.02 | 84.00 |
| $GeO_2$ |  |  |  |
| $TeO_2$ | 2.91 | 4.74 |  |
| Total (%) | 100.00 | 100.00 | 100.00 |
| nd | 2.1 | 2.1 | 2.1 |
| vd | 17 | 17 | 17 |
| Defoamability [Grade] | 1 | 1 | 9 |

No bubble was seen in the glass of Examples of the invention, and the glass is usable as optical glass. However, the glass of Comparative Example contained many bubbles having a diameter of from 10 μm to 1 mm or so, and it could not be used as optical glass.

What is claimed is

1. Optical glass, comprising, as % by mass:
   from 10 to less than 90% of a $Bi_2O_3$ component,
   at least 0.1% of a $Rn_2O$ component (Rn represents at least one selected from the group consisting of Li, Na, K, and Cs),
   at least 0.1% of a $TeO_2$ component and/or $SeO_2$ component,
   not more than 10% of a $B_2O_3$ component, and
   not more than 20% of an $SiO_2$ component,
   wherein the optical glass does not comprise lead component, wherein the optical glass is on a level of Grade 4 to Grade 1 according to "JOGIS12-1994, Method for Measuring Bubbles in Optical Glass".

2. The optical glass as claimed in claim 1, having optical constants of a refractive index [nd] of at least 1.70 and an Abbe's number [vd] of at least 10.

3. The optical glass as claimed in claim 1 or 2, having a glass transition point (Tg) of not higher than 530° C.

4. The optical glass as claimed in claim 1, further comprising an RO component (R represents at least one selected from a group consisting of Zn, Ba, Sr, Ca, Mg).

5. The optical glass as claimed in claim 1, further comprising, as % by mass, more than 0% of $B_2O_3$ component.

6. The optical glass as claimed in claim 1, further comprising as % by mass one or more components of:

| $Al_2O_3$ | 0 to 20% and/or |
| $TiO_2$ | 0 to 20% and/or |
| $Nb_2O_5$ | 0 to 20% and/or |
| $WO_3$ | 0 to 15% and/or |
| $Ta_2O_5$ | 0 to 15% and/or |
| $ZrO_2$ | 0 to 15% and/or |
| ZnO | 0 to 20% and/or |
| MgO | 0 to 20% and/or |
| CaO | 0 to 30% and/or |
| SrO | 0 to 40% and/or |
| BaO | 0 to 40% and/or |
| $Li_2O$ | 0 to 20% and/or |
| $Na_2O$ | 0 to 20% and/or |
| $K_2O$ | 0 to 20% and/or |
| $Cs_2O$ | 0 to 20% and/or |
| $Y_2O_3$ | 0 to 10% and/or |
| $La_2O_3$ | 0 to 10% and/or |

-continued

| | |
|---|---|
| Gd$_2$O$_3$ | 0 to 10% and/or |
| Yb$_2$O$_3$ | 0 to 10% and/or |
| P$_2$O$_5$ | 0 to 10% and/or |
| Sb$_2$O$_3$ | 0 to 3% and/or |
| GeO$_2$ | 0 to 20%, | wherein the components are contained in such a manner that the total amount of F in fluoride substitution of a part or all of the above oxides may be from 0 to 5% by mass based on 100% by mass of the above oxide standard composition, and wherein Y$_2$O$_3$+La$_2$O$_3$+Gd$_2$O$_3$+Yb$_2$O$_3$ accounts for at most 10%.

7. The optical glass of claim 1, wherein the optical glass is a preform for precision press-molding.

8. The optical glass of claim 1, wherein the optical glass is included in a optical device formed through precision press-molding.

9. A method for producing optical glass comprising:
adding, in oxide equivalent amount, at least 0.1% of a Te and/or Se component to a starting material, wherein said optical glass comprises, as % by mass, from 10 to less than 90% of a Bi$_2$O$_3$ component, at least 0.1% of a Rn$_2$O component (Rn represents one or more selected from the group consisting of Li, Na, K, and Cs), at least 0.1% of a TeO$_2$ component and/or SeO$_2$ component, not more than 10% of a B$_2$O$_3$ component, and not more than 20% of an SiO$_2$ component, wherein the optical glass does not comprise lead component.

10. The optical glass as claimed in claim 1, wherein the optical glass does not contain V component.

11. The method as claimed in claim 9, wherein the optical glass does not contain V component.

12. The method as claimed in claim 9, wherein the optical glass further comprises an RO component (R represents at least one selected from a group consisting of Zn, Ba, Sr, Ca, Mg).

13. The method as claimed in claim 9, wherein the optical glass further comprises, as % by mass, more than 0% of B$_2$O$_3$ component.

14. The method as claimed in claim 9, wherein the optical glass further comprises, as % by mass, one or more components of:

| | |
|---|---|
| Al$_2$O$_3$ | 0 to 20% and/or |
| TiO$_2$ | 0 to 20% and/or |
| Nb$_2$O$_5$ | 0 to 20% and/or |
| WO$_3$ | 0 to 15% and/or |
| Ta$_2$O$_5$ | 0 to 15% and/or |
| ZrO$_2$ | 0 to 15% and/or |
| ZnO | 0 to 20% and/or |
| MgO | 0 to 20% and/or |
| CaO | 0 to 30% and/or |
| SrO | 0 to 40% and/or |
| BaO | 0 to 40% and/or |
| Li$_2$O | 0 to 20% and/or |
| Na$_2$O | 0 to 20% and/or |
| K$_2$O | 0 to 20% and/or |
| Cs$_2$O | 0 to 20% and/or |
| Y$_2$O$_3$ | 0 to 10% and/or |
| La$_2$O$_3$ | 0 to 10% and/or |
| Gd$_2$O$_3$ | 0 to 10% and/or |
| Yb$_2$O$_3$ | 0 to 10% and/or |
| P$_2$O$_5$ | 0 to 10% and/or |
| Sb$_2$O$_3$ | 0 to 3% and/or |
| GeO$_2$ | 0 to 20%, | wherein the components are contained in such a manner that the total amount of F in fluoride substitution of a part or all of the above oxides may be from 0 to 5% by mass based on 100% by mass of the above oxide standard composition, and wherein Y$_2$O$_3$+La$_2$O$_3$+Gd$_2$O$_3$+Yb$_2$O$_3$ accounts for at most 10%.

15. The optical glass as claimed in claim 1, wherein the optical glass comprises, as % by mass, more than 0% of SiO$_2$ component.

16. The method as claimed in claim 9, wherein the optical glass comprises, as % by mass, more than 0% of SiO$_2$ component.

17. The optical glass as claimed in claim 1, wherein RO (R represents at least one selected from a group consisting of Zn, Ba, Sr, Ca, Mg)+Rn$_2$O (wherein Rn represents at least one selected from a group consisting of Li, Na, K, Cs accounts for at most 50% by mass.

18. The method as claimed in claim 9, wherein RO (R represents at least one selected from a group consisting of Zn, Ba, Sr, Ca, Mg)+Rn$_2$O (wherein Rn represents at least one selected from a group consisting of Li, Na, K, Cs) accounts for at most 50% by mass.

* * * * *